No. 863,750. PATENTED AUG. 20, 1907.
B. PAHLITZSCH.
GUMMING MECHANISM FOR ENVELOP MACHINES.
APPLICATION FILED SEPT. 24, 1906.

2 SHEETS—SHEET 2.

Witnesses
Inventor
Bruno Pahlitzsch
By
Attorneys

UNITED STATES PATENT OFFICE.

BRUNO PAHLITZSCH, OF BERLIN, GERMANY, ASSIGNOR TO UNITED STATES ENVELOPE COMPANY, A CORPORATION OF MASSACHUSETTS.

GUMMING MECHANISM FOR ENVELOP-MACHINES.

No. 863,750.　　　　　　Specification of Letters Patent.　　　　　Patented Aug. 20, 1907.

Application filed September 24, 1906. Serial No. 335,885.

*To all whom it may concern:*

Be it known that I, BRUNO PAHLITZSCH, a subject of the Emperor of Germany, residing at Berlin, Germany, have invented new and useful Improvements in Gumming Mechanism for Envelop-Machines, of which the following is a specification.

The present invention relates to improvements in gumming mechanism for envelop machines.

The object of my invention is to provide gumming mechanism which will take up the requisite amount of gum and apply it to the flaps with certainty and rapidity, which will insure cleanliness and avoidance of over-gumming in the handling of the blanks and which, furthermore, can be easily and expeditiously adjusted to conform to blanks of different sizes, whereby a highly flexible arrangement and one covering a wide range of blanks, in size and shape, is secured.

Figure 1:
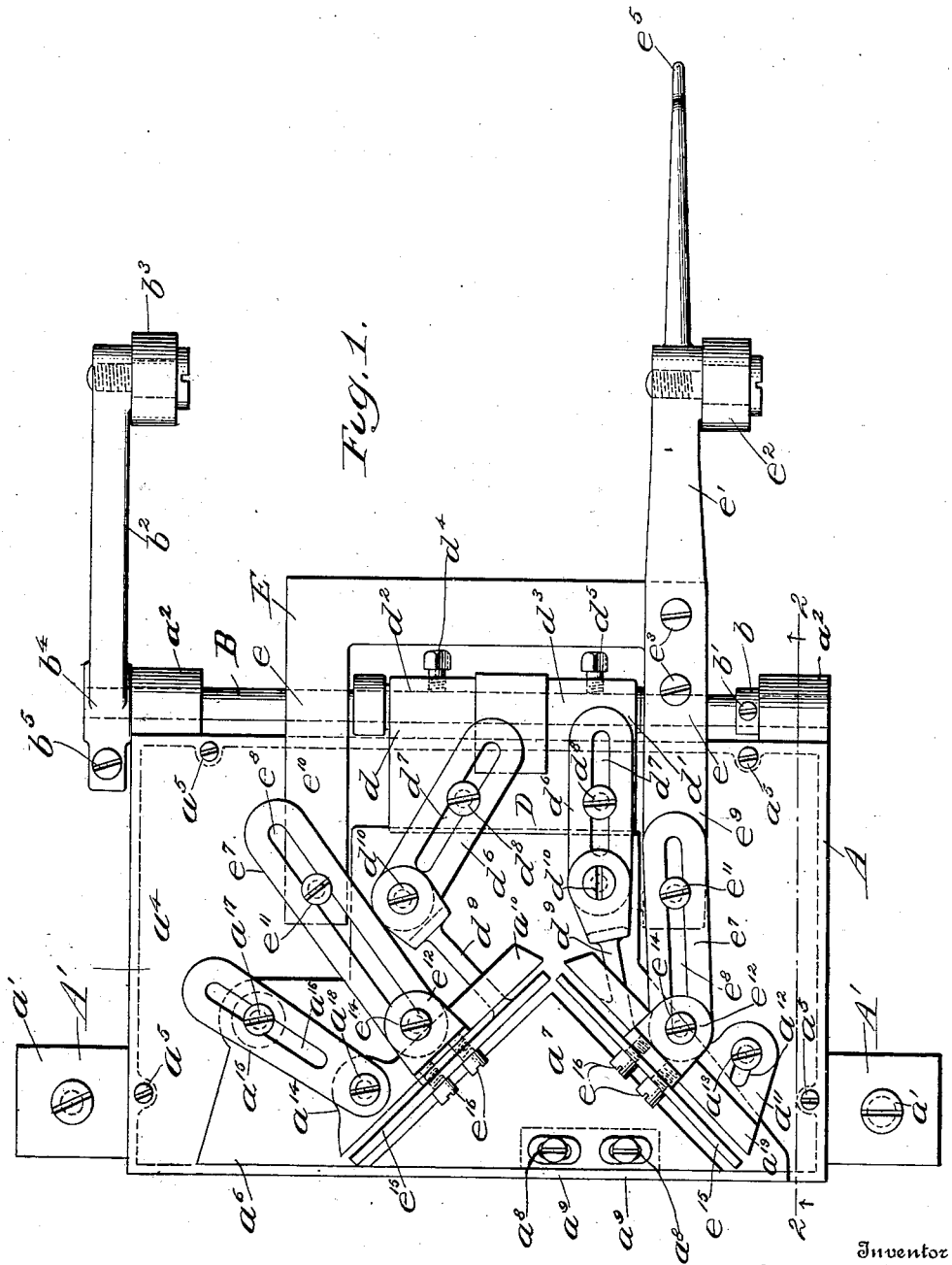
Figure 2:
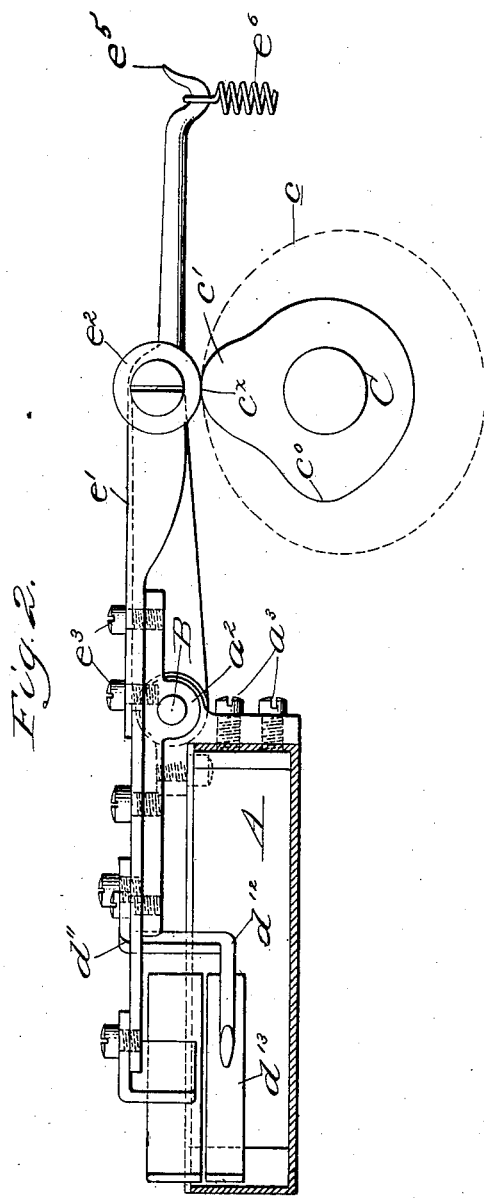

In the drawings herewith I have illustrated one embodiment of my invention, and in said drawings; Figure 1 is a plan view of my improvement. Fig. 2 is a section on the line 2—2 of Fig. 1.

In the present embodiment of my invention the gum box A is secured to the frame work of the machine upon which it is to be used, by means of the screws $a'$ traversing openings in feet A′ projecting from the gum box, and the rear side of the gum box is provided with bearings $a^2$ secured thereto by screws $a^3$, in which is journaled a shaft B. The shaft B is provided with a collar $b$, adjacent to one of the bearings for preventing longitudinal movement of the shaft, the collar being secured by the set screw $b'$, and an arm $b^2$ rigid with the shaft, and provided at its free end with roller $b^3$, projects rearwardly from the shaft, the roller contacting with cam $c$ on a shaft C, journaled on a suitable part of the machine frame, and driven by any suitable means. The arm $b^2$ is provided with a split bearing $b^4$ for engaging the shaft B, and a set screw $b^5$ is provided for tightening the bearing, after the arm is properly adjusted with respect to the shaft.

A bracket D is rigidly connected with the shaft B, the bracket having arms $d$ $d'$, provided with bearings $d^2$ $d^3$ engaging the shaft and fixed thereon by the set screws $d^4$ $d^5$, and plates $d^6$, provided with longitudinal slots $d^7$ are adjustably secured to the bracket, by means of set screws $d^8$ traversing the slots, and threaded into the bracket. Arms $d^9$ are adjustably connected with the plates $d^6$ by means of set screws $d^{10}$ traversing openings in the arms and threaded into the plates. The free ends of the arms are bent vertically as at $d^{11}$, and longitudinally as at $d^{12}$, and the gumming pads $d^{13}$, are secured to the longitudinal portion $d^{12}$. The vertical portion $d^{11}$, of the arms offsets the portion $d^{12}$, from the arms proper a sufficient distance, to place the gumming pads normally below the gum in the gum box.

It will be evident from the description that by loosening the set screws $d^8$ $d^{10}$, the position of the gumming pads in the gum box and their relation with respect to each other may be widely varied, to conform with the shape and size of the flap to be operated upon.

A U-shaped frame E is loosely journaled on the shaft B by means of bearings $e$, and an arm $e'$ provided with a roller $e^2$, is secured to one of the arms of the frame, by the screws $e^3$, the arm being extended with a hook $e^5$ for a purpose to be hereinafter mentioned. The roller $e^2$ is engaged by a cam $c'$ on the shaft C before described, and is retained in contact therewith by a spring $e^6$, engaging the hook $e^5$ and a stationary part of the machine frame. Plates $e^7$ having longitudinal slots $e^8$, are connected with the forwardly extending arms $e^9$ $e^{10}$ of the yoke E, by means of set screws $e^{11}$ traversing the slots and threaded into the yoke arms, each of the plates $e^7$ has connected to the free end thereof the angular portion $e^{12}$, of a bracket $e^{13}$, by means of a set screw $e^{14}$. Gummers $e^{15}$, corresponding in length and thickness to the gumming pads $d^{13}$ are secured to the bracket $e^{13}$, by the screws $e^{16}$.

It will be obvious from the description that the gummers $e^{15}$ may be adjusted to conform with the position of the gumming pads $d^{13}$, by loosening the set screws $e^{14}$ $e^{14}$, said gummers being adjustable over the same range of movement as the gumming pads. The cam $c'$, operating the gummers is provided with two eccentric portions $c^{\times}$, $c^0$, having a depression therebetween, the remainder of the cam surface being substantially concentric. The cam $c'$, operating the gumming pads, is shaped to impart to the said pads a relatively sharp pull and to retain them at a fixed height during a considerable space of time, afterwards allowing them to gradually rise to their original position. While the gumming pads are at their highest point, the roller $e^2$, is engaged by the eccentric portion $c^{\times}$ of the cam $c'$, and the gummers are pressed against the gumming pads. The gumming pads now drop back into the gum box, the roller $e^2$ moves into the depression before mentioned, and the spring $e^6$, raises the gummers to permit the insertion of the envelop flap beneath the same. The roller $e^2$, is then engaged by the eccentric portion $c^0$, of the cam $c'$ and the gummers are pressed against the flap, leaving a strip of gum along the edge thereof, when the roller passes off the eccentric portion $c^0$, the gummers are again elevated, permitting the removal of the blank.

It will be seen that the gummers move twice to each movement of the pads, dipping one to press the pads and take their charge of gum as the pads rise, and dropping a second time to lay the gum upon the flap which is positioned beneath them. Furthermore, the gummers and pads move in arcuate planes coincident with each other due to their concentric pivoting, and very simple movements suffice for their operation, doing away with the necessity of compound movements and complicated mechanism for effecting them.

Some support is necessary for the under face of the flap during the gumming operation, and for this purpose, the gum box is provided with a top $a^4$, secured thereto by screws $a^5$ and having a portion thereof at the front of the box removed to provide an opening $a^6$. A triangular plate $a^7$ partially closes the opening $a^6$, the said plate being provided with slots $a^8$ at one edge, and adjustably secured to the gum box by the set screws $a^9$, passing through the slots and engaging the side of the gum box. Plates $a^{19}$ $a^{10}$, substantially rectangular in shape are arranged adjacent to the free edges of the triangular plate and co-act therewith to form slots, for permitting the passage of the gummers, and to support the under face of the flap during the gumming operation. The plate $a^{19}$ is provided with a lug $a^{11}$, having a slot $a^{12}$ through which passes a set screw $a^{13}$ threaded into the top $a^4$, by loosening the set screw $a^{13}$, the plate $a^{19}$ may be adjusted to conform with the adjustment of the gummer adjacent thereto. The plate $a^{10}$ is provided with a lug $a^{14}$, and an arm $a^{15}$ is adjustably secured to the plate, by a set screw $a^{18}$, traversing an opening in the arm and threaded into the plate. The arm $a^{15}$ is provided with a longitudinal slot $a^{16}$, and is adjustably secured to the top $a^4$, by means of a set screw $a^{17}$ traversing the slot and threaded into the top. By loosening the set screw $a^{18}$ the angle of the plate $a^{10}$ may be varied, and by loosening the set screw $a^{17}$, the distance between the plates may be varied, a double adjustment being thus obtained, whereby the plates may be adjusted for flaps of different sizes, as well as for blanks having differently shaped flaps. The triangular plate $a^7$, is also capable of adjustment by means of the slots $a^8$, and set screws $a^9$, but interchangeable plates of different shapes and sizes are preferably made use of.

In the practical use of my improvement, the front edge of the gum box A forms one side of the forming well of the envelop machine, and the blank is moved over the forming well by any suitable mechanism (not shown), with the side flap between the gummers and the gumming pads, and with the back of the flap resting on the triangular plate $a^7$ and on the plates $a^{19}$ $a^{10}$. When the gummers descend on the flap, they leave a line of gum somewhat removed from the edge of the flap, so that when the flap is folded upon the end flaps, no gum will exude from the edge of the flap. This is a feature of advantage, since the folded envelops are generally bunched and packed while the gum is not yet dry.

What I claim is:—

1. In a machine of the class described, a gumming mechanism comprising a gum box, gumming pads supported for vertical movement in the gum box, means whereby to adjust the angle of the pads with respect to each other, means whereby to vary the distances of the pads from each other, gummers mounted for vertical movement above the gumming pads, and means for adjusting the gummers to register with the pads.

2. In a machine of the class described, a gumming mechanism comprising a box for containing gum, gumming pads supported within the box normally below the surface of the gum, means for adjusting the pads toward and from each other, means for varying the angle of the pads with respect to each other, gummers supported above the pads, means for adjusting the gummers to register with the pads above the surface of the gum, and means for moving the gummers into contact with the pads, while said pads are above the gum.

3. In a machine of the class described, a gumming mechanism comprising a box for containing gum, gumming pads supported within the box and normally below the surface of the gum, means for adjusting the pads toward and from each other, means for varying the angle of the pads with respect to each other, gummers supported above the pads, means for adjusting the gummers to register with the pads above the surface of the gum, means for supporting an envelop flap between the gummers and the pads, and means for moving the gummers into contact with the flap while so supported.

4. In a machine of the class described, a gumming mechanism comprising a box containing gum, gumming pads supported within the box and normally below the surface of the gum, means for adjusting the pads toward and from each other, means for varying the angle of the pads with respect to each other, gummers supported above the pads, means for adjusting the gummers to register with the pads above the surface of the gum, means for supporting an envelop flap between the gummers, means for adjusting said supporting means to correspond with the position of the gummers, and means for moving the gummers into contact with the flap while on the support.

5. In a machine of the class described, a plurality of gummers, means for adjusting the gummers toward and from each other, means for varying the angle of the gummers with respect to each other, pads for applying gum to the gummers, means for adjusting the pads to register with the gummers, means for supporting the article to be gummed between the gummers and the gumming pads, and means for adjusting said supporting means to correspond with the position of the gummers.

6. In a machine of the class described, a plurality of gummers, means for adjusting the gummers toward and from each other, means for varying the angle of the gummers with respect to each other, means for supporting the article to be gummed, and means for adjusting said support to correspond with the position of the gummers.

7. In a machine of the class described, a gum box having an opening in the top thereof, a plurality of gummers movable through the opening, means for varying the inclination of the gummers with respect to each other, means for adjusting the gummers toward and from each other, supporting plates for the article to be gummed arranged adjacent to the gummers, and means for varying the position of the plates to correspond with the position of the gummers.

8. In a machine of the class described, means for applying a plurality of lines of gum to the edge of a blank comprising a plurality of gummers, means for adjusting the gummers toward and from each other, means for varying the angle of the gummers with respect to each other, plates for supporting the edge of the blank adjacent to each of the gummers, and means for varying the position of the plates to correspond with the position of the gummers.

9. In a machine of the class described, a gum box, a movable gumming pad for raising gum from the gum box, a movable gummer outside the gum box, means for supporting the blank between the gumming pad and gummer, and means for moving the gummer in alternate movements of different amplitudes in the same path, the greater movement bringing the gummer into contact with the gumming pad and the lesser movement into contact with the blank.

10. In a machine of the class described and in combination, a gum box, a gumming pad in said gum box, means for raising and lowering said pad, a gummer for applying gum to the blank, means for actuating said gummer twice in the same path to each movement of said pad, and blank-supporting means between said pad and gummer.

11. In a machine of the class described and in combination, a gum box, a gumming pad in said gum box, means for raising and lowering said pad, a gummer for applying gum to the blank movable in a plane coincident with the plane of movement of said pad, means for actuating said gummer twice to each movement of said pad, and blank-supporting means in a plane at right-angles, to and substantially intermediate said pad and gummer.

12. In a machine of the class described and in combination, a gum box, a gum raising pad in said gum-box, a movable gummer outside said gum box, means for moving said pad and gummer to and from each other in coincident planes and for giving said gummer alternate movements of different amplitudes, and blank-supporting means between said pad and gummer.

13. In a machine of the class described and in combination, a gum-box, a pivoted gum-raising pad in said gum-box, a concentrically pivoted gummer outside said gum-box, means for actuating said pad and gummer in coincident planes, and blank-supporting means in a plane between said pad and gummer.

14. In a machine of the class described, and in combination, a gum box, a pivoted gum-raising pad in said gum-box, a concentrically pivoted gummer outside said gum-box, means for rocking said pad, means for rocking said gummer twice to each movement of said pad, and blank-supporting means in a plane between said pad and gummer.

15. In a machine of the class described and in combination, a gum-box, blank-supporting means extending over said gum-box, a gum-raising pad in said gum-box movable in a plane adjacent said blank-supporting means, a gummer outside said gum-box movable in a plane coincident with the plane of movement of said pad, and means for actuating said pad and gummer.

16. In a machine of the class described, and in combination a gum-box, a blank-support over said gum-box, flap-supporting means adjacent said blank support, gum-raising pads and gummers movable, in coincident planes between said blank-support and said flap-support, and means for actuating said pads and gummers.

In testimony whereof I have hereunto set my hand in presence of two subscribing witnesses.

BRUNO PAHLITZSCH.

Witnesses:
 HENRY HASPER,
 WOLDEMAR HAUPT.